Feb. 10, 1948.   A. SHAPIRO   2,435,906
PASTRY CUP
Filed Sept. 9, 1946
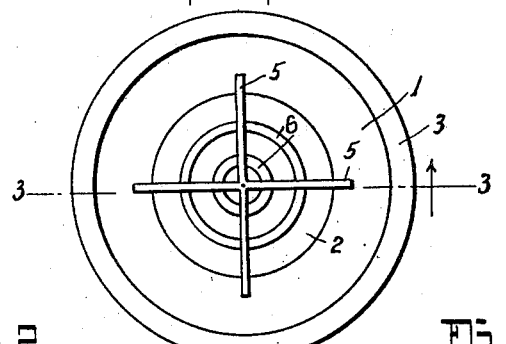
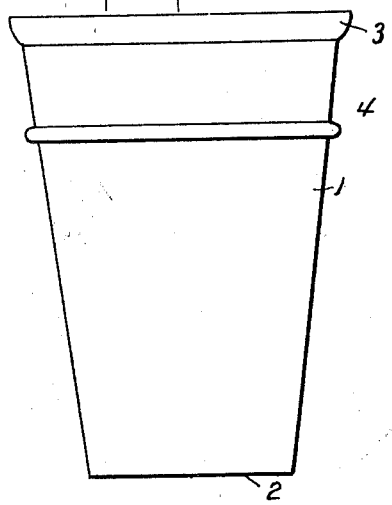
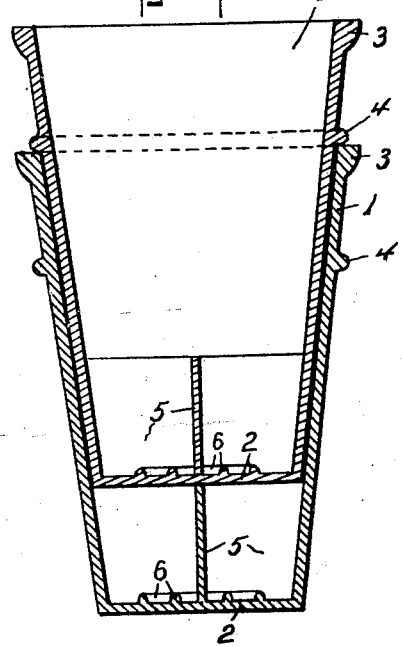
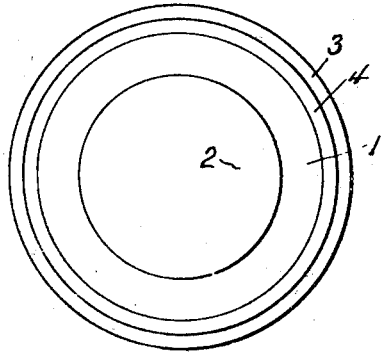
INVENTOR,
Arthur Shapiro,
BY
Albert E. Dieterich,
ATTORNEY.

Patented Feb. 10, 1948

2,435,906

UNITED STATES PATENT OFFICE 2,435,906

PASTRY CUP

Arthur Shapiro, Chicago, Ill., assignor to Maryland Baking Company, Inc., Baltimore, Md., a corporation of Maryland Application September 9, 1946, Serial No. 695,651

3 Claims. (Cl. 99—89)

My invention relates to pastry cups designed to hold ice cream, fruits, custards and other similar products.

The kind of cup which I have improved has a flat bottom with an upwardly tapering body, the edge of which is surrounded by a mouth bead, a nesting ring being provided at a suitable distance below the mouth ring so that a number of cups can be nested together for shipment. Experience has shown that the bottom of the cup shrinks and wrinkles if left in stock too long. Efforts have been made heretofore to prevent this by providing longitudinal shallow ribs along the side wall of the cup, which ribs extend from the bottom upwardly a short distance and an annular rib has been molded in the bottom of the cup concentric with its axis. While such ribs help the difficulty to some degree and the cups can "get by" during the summer months when the merchandise moves fast, such ribs do not fully solve the problem as the cups do not satisfactorily survive winter storage without the bottoms warping, or cracking due to shrinkage and absorption of moisture from the air. My present invention has solved the problem and by its use makes it possible to store the cups for an indefinite time without deformation of the bottoms.

My invention will be readily understood by reference to the accompanying drawing in which:

Fig. 1 is a top plan view of a cup embodying the invention.

Fig. 2 is a side elevation of the same.

Fig. 3 is a section on the line 3—3 of Fig. 1 showing two cups nested.

Fig. 4 is a bottom view of the cup shown in Fig. 2.

In the drawing I designates the body or side wall of the cup, 2 the flat bottom, 3 the mouth ring and 4 the nesting ring, all of which are of known construction.

My invention resides in the provision of crossed walls or wings 5 which are united to and extend across the bottom 2 within the cup and from side to side of the body wall I. These walls or wings 5 are of a uniform height approximately equal to the length of the mouth end of the cup that is exposed when two cups are nested together. Thus the walls or wings 5 serve two purposes, namely, they prevent warping, buckling and cracking of the bottom 2 and lower end of wall I and they also serve as supplemental nesting stops when two or more cones are nested together, thereby preventing shearing of the nesting ring 4 should too much nesting pressure be applied.

The bottom 2 may also be provided with stiffening annular ribs or rings 6 if desired.

From the foregoing description taken in connection with the accompanying drawing, it is thought the construction and advantages of the invention will be clear.

What I claim is:

1. A pastry cup having an annular side wall and a flat bottom and crossed wings integral with the bottom and side wall of the cup, said wings serving to prevent buckling and cracking of the bottom, and also serving as a nesting stop.

2. In a pastry cup having a flat bottom and an annular side wall with a mouth ring and a nesting ring: the improvement which comprises, crossed wings integral with the bottom and side walls and of a height to serve as a nesting stop and prevent shearing of the nesting rings when two or more cups are nested together and to prevent deformation of the bottom.

3. A pastry cup having annular side wall and a flat bottom and crossed wings integral with the bottom and side wall, said wings being of a height sufficient to restrain one cup against wedging into another cup when the cups are nested together, said wings further serving to prevent buckling of the bottom of the cup, said cup also having ring-like ribs on the inner face of the cup bottom, said ring-like ribs being intersected by said wings.

ARTHUR SHAPIRO.

REFERENCES CITED

The following references are of record in the file of this patent:

UNITED STATES PATENTS

| Number | Name | Date |
|---|---|---|
| 1,498,464 | Marinelli | June 17, 1924 |
| 1,615,681 | Buhse et al. | Jan. 25, 1927 |